(12) United States Patent
Nalesnik et al.

(10) Patent No.: US 7,879,934 B2
(45) Date of Patent: Feb. 1, 2011

(54) RUBBER COMPOSITIONS

(75) Inventors: Theodore E. Nalesnik, Hopewell Junction, NY (US); John Kounavis, Woodbury, CT (US); Joseph Stieber, Prospect, CT (US)

(73) Assignee: Chemtura Corporation, Middlebury, CT (US)

( * ) Notice: Subject to any disclaimer, the term of this patent is extended or adjusted under 35 U.S.C. 154(b) by 602 days.

(21) Appl. No.: 11/894,006

(22) Filed: Aug. 16, 2007

(65) Prior Publication Data

US 2009/0048376 A1 Feb. 19, 2009

(51) Int. Cl.
*C08C 19/02* (2006.01)
*C08K 5/18* (2006.01)
*C08K 5/00* (2006.01)
*C08K 5/01* (2006.01)
*A01N 33/06* (2006.01)

(52) U.S. Cl. .................. 524/147; 524/255; 524/151; 524/254; 524/575.5

(58) Field of Classification Search .................. 524/147, 524/255, 151, 254, 575.5
See application file for complete search history.

(56) References Cited

U.S. PATENT DOCUMENTS

| | | | |
|---|---|---|---|
| 3,293,181 A | 12/1966 | Stuart | |
| 3,396,109 A | 8/1968 | Butler et al. | |
| 3,397,145 A | 8/1968 | Cyba | |
| 3,442,804 A | 5/1969 | Le Suer et al. | |
| 3,637,499 A | 1/1972 | Pollak | |
| 4,559,378 A * | 12/1985 | Kay et al. | 524/147 |
| 5,498,809 A | 3/1996 | Emert et al. | |
| 2007/0082828 A1 * | 4/2007 | Nalesnik | 508/545 |
| 2007/0142243 A1 | 6/2007 | Cherpeck et al. | |
| 2007/0142245 A1 | 6/2007 | Cherpeck et al. | |
| 2007/0142246 A1 | 6/2007 | Cherpeck et al. | |

FOREIGN PATENT DOCUMENTS

| | | |
|---|---|---|
| DE | 29 28 248 A1 | 1/1981 |
| EP | 0 867 472 A1 | 9/1998 |
| EP | 0867472 A1 * | 9/1998 |
| WO | WO 2006/011877 A | 2/2006 |
| WO | WO 2006011877 * | 2/2006 |

OTHER PUBLICATIONS

Buu-Hoi, Ng. Ph. et al. "Carcinogenic Nitrogen Compounds. Part XX. Benzacridines, Benzocarbazoles, and Benzophenarsazines with Hydrogenated Rings", *Journal of the Chemical Society*, pp. 2593-2596 (1956).

PCT Notification of Transmittal of the International Search Report and the Written Opinion of the International Searching Authority regarding PCT Application No PCT/US2008/071862 as mailed on July 10, 2008.

PCT International Search Report regarding PCT Application No. PCT/US2008/071862 as mailed on Jul. 10, 2008.

PCT Written Opinion of the International Searching Authority regarding PCT Application No. PCT/US2008/071862 as mailed on Jul. 10, 2008.

* cited by examiner

*Primary Examiner*—William K Cheung
(74) *Attorney, Agent, or Firm*—Joseph Suhadolnik

(57) ABSTRACT

A rubber composition is disclosed wherein the rubber composition contains at least an effective amount of at least one substituted or unsubstituted diaryl amine-containing compound having at least one substituted or unsubstituted, saturated or partially saturated $C_5$-$C_{30}$ ring structure optionally containing one or more heteroatoms fused to at least one of the aryl rings.

30 Claims, No Drawings

RUBBER COMPOSITIONS

BACKGROUND OF THE INVENTION

1. Technical Field

The present invention generally relates to rubber compositions. The rubber compositions are particularly useful for tire treads, sidewalls and other tire components in a vehicle, e.g., bicycles, motor bikes, passenger automobiles and trucks.

2. Description of the Related Art

It is well known that ozone causes surface cracking of conventional highly unsaturated rubber vulcanizates used in tires when the rubber is placed under strain in an ozone environment. The most severe deterioration occurs when a small number of cracks are formed which grow rapidly into deep, disruptive fissures. These ozone cracks shorten the serviceable life of the tire, especially in the area of the sidewall.

Rubber tires conventionally also have visually exposed external components of one or more rubber compositions which, when exposed to weathering atmospheric conditions and dynamic use, tend to discolor to various degrees and provide an external tire appearance which is not typically uniform in nature. Such tire components having visually exposed surfaces are, for example, tire sidewalls, tire chafers, and tire treads. For example, a black colored tire sidewall may become brown in color as a result of migration of antidegradants to the surface of the rubber composition, together with exposure to atmospheric ozone, ultraviolet light and weathering in general. Such phenomena are well known to those having skill in such art.

Conventional chemical antidegradants have been developed to retard the formation of the ozone cracks occurring under static and dynamic conditions. One class of antidegradants is phenylenediamine compounds. See, e.g., U.S. Pat. Nos. 5,420,354; 5,574,187; 5,840,982 and 6,201,049. Examples of such antidegradants in common use include N-phenyl-N'-(1,3-dimethylbutyl)-p-phenylenediamine; N-phenyl-N'-isopropyl-p-phenylenediamine; N-phenyl-N'-(1,4-dimethylpentyl)-p-phenylenediamine; N-phenyl-N'-(1-methylheptyl)-p-phenylenediamine; N-phenyl-N'-cyclohexyl-p-phenylenediamine; mixed diaryl-p-phenylenediamines; N,N'-diphenyl-p-phenylenediamine; N,N'-di-beta-naphthyl-p-phenylenediamine; N,N'-bis(1,4-dimethylpentyl)-p-phenylenediamine; N,N'-bis(1-ethyl-3-methylpentyl)-p-phenylenediamine; N,N'-bis(1-methylheptyl)-p-phenylenediamine; N-phenyl-N'-p-toluenesulfonyl-p-phenylenediamine and blends of these materials.

While the use of these well known paraphenylenediamine compounds has improved ozone protection under both static and dynamic conditions, these compounds have a very strong tendency to stain, discolor, and to form a noticeable brownish bloom on the exposed surfaces. In tires, which are the largest application in which ozone protection is required, an objectionable, noticeably brown, dull surface is typically created on the sidewall by the paraphenylenediamine compounds.

In addition, the retreading of tires is a common practice in the tire industry, as it allows the original tire carcass or casing, to be reused once the tread has served its useful life. Typically, the retreading of tires, and particularly truck tires, is carried out not only once, but a plurality of times in some cases. This is desirable in that it is less costly to replace the tread instead of purchasing a new tire. Also, it reduces the environmental impact of tire disposal. In order to be able to retread a tire multiple times, the structural integrity of the carcass must be maintained for as long as possible. However, the structural integrity of a tire carcass can degrade over time due to, for example, oxidation and/or flex fatigue, which could limit the number of times the tire is retreaded. This is particularly a problem for truck tires.

Accordingly, it would be desirable to provide rubber compositions having improved ozone resistance while also being able to mask, retard, and/or substantially eliminate for an extended period of time, such dulling and/or discoloring (usually browning) of the exposed surface of a tire component such as a sidewall due to such migration of various antidegradants and the like and/or exposure to atmospheric conditions. It would also be desirable to provide a tire carcass having improved structural integrity for a prolonged period of time so as to maximize the number of times a tire could be retreaded.

SUMMARY OF THE INVENTION

In accordance with one embodiment of the present invention, a rubber composition is provided which comprises (a) at least one rubber component; (b) a filler; and (c) an effective amount of at least one substituted or unsubstituted diaryl amine-containing compound having at least one substituted or unsubstituted, saturated or partially saturated $C_5$-$C_{30}$ ring structure optionally containing one or more heteroatoms fused to at least one of the aryl rings.

In accordance with a second embodiment of the present invention, a rubber composition is provided which comprises (a) at least one rubber component; (b) a filler; and (c) an effective amount of a diaryl amine-containing compound having the general formula:

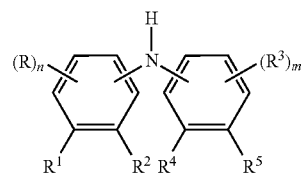

wherein n is from 0 to 3; m is from 0 to 3; each R and $R^3$ substituent is independently hydrogen, a straight or branched $C_1$-$C_{30}$ alkyl group or alkenyl group, substituted or unsubstituted $C_3$-$C_{12}$ cycloalkyl group, substituted or unsubstituted $C_5$-$C_{12}$ aryl group, hydroxyl-containing group, halogen group, substituted or unsubstituted $C_1$-$C_{20}$ alkoxy group, ester-containing group, ether-containing group, polyether-containing group, amide-containing group, or amine-containing group or two R substituents and/or two $R^3$ substituents together with the carbon atom to which they are bonded are joined together to form a substituted or unsubstituted, saturated, partially saturated or unsaturated $C_5$-$C_{30}$ ring structure optionally containing one or more heteroatoms; $R^1$ and $R^2$ together with the carbon atom to which they are bonded are joined together to form a substituted or unsubstituted, saturated or partially saturated $C_5$-$C_{30}$ ring structure optionally containing one or more heteroatoms, and $R^4$ and $R^5$ are independently hydrogen, a straight or branched $C_1$-$C_{30}$ alkyl group or alkenyl group, substituted or unsubstituted $C_3$-$C_{12}$ cycloalkyl group, substituted or unsubstituted $C_5$-$C_{12}$ aryl group, hydroxyl-containing group, halogen group, substituted or unsubstituted $C_1$-$C_{20}$ alkoxy group, ester-containing group, ether-containing group, polyether-containing group, amide-containing group, or amine-containing group or $R^4$ and $R^5$ together with the carbon atom to which they are bonded are joined together to form a substituted or unsubstituted, saturated or partially saturated $C_5$-$C_{30}$ ring structure optionally containing one or more heteroatoms or an isomer thereof.

In accordance with a third embodiment of the present invention, a tire having at least one component with a visually observable outer surface, the at least one component comprising a rubber composition comprising (a) at least one rubber component; and (b) an effective amount of at least one substituted or unsubstituted diaryl amine-containing compound having at least one substituted or unsubstituted, saturated or partially saturated $C_5$-$C_{30}$ ring structure optionally containing one or more heteroatoms fused to at least one of the aryl rings.

In accordance with a fourth embodiment of the present invention, a tire having at least one component with a visually observable outer surface, the at least one component comprising a rubber composition comprising (a) at least one rubber component; and (b) an effective amount of a diaryl amine-containing compound having the general formula:

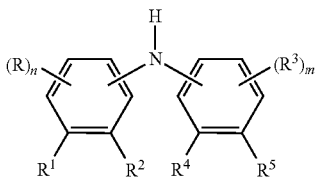

wherein n; m; R, $R^1$, $R^2$, $R^3$; $R^4$ and $R^5$ have the aforestated meanings.

In accordance with a fifth embodiment of the present invention, a tire having a sidewall is provided, the sidewall comprising a rubber composition comprising (a) at least one rubber component; and (b) an effective amount of at least one substituted or unsubstituted diaryl amine-containing compound having at least one substituted or unsubstituted, saturated or partially saturated $C_5$-$C_{30}$ ring structure optionally containing one or more heteroatoms fused to at least one of the aryl rings.

In accordance with a sixth embodiment of the present invention, a tire having a sidewall is provided, the sidewall comprising a rubber composition comprising (a) at least one rubber component; and (b) an effective amount of a diaryl amine-containing compound having the general formula:

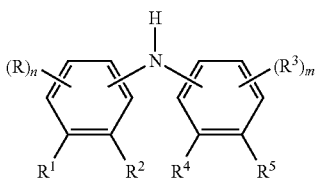

wherein n; m; R, $R^1$, $R^2$, $R^3$; $R^4$ and $R^5$ have the aforestated meanings.

In accordance with a seventh embodiment of the present invention, a tire having a carcass is provided, the carcass comprising a rubber composition comprising (a) at least one rubber component; and (b) an effective amount of at least one substituted or unsubstituted diaryl amine-containing compound having at least one substituted or unsubstituted, saturated or partially saturated $C_5$-$C_{30}$ ring structure optionally containing one or more heteroatoms fused to at least one of the aryl rings.

In accordance with an eighth embodiment of the present invention, a tire having a carcass is provided, the carcass comprising a rubber composition comprising (a) at least one rubber component; and (b) an effective amount of a diaryl amine-containing compound having the general formula:

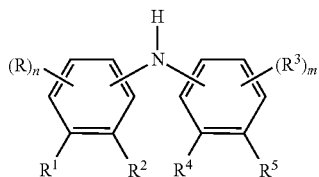

wherein; m; R, $R^1$, $R^2$, $R^3$; $R^4$ and $R^5$ have the aforestated meanings.

In accordance with a ninth embodiment of the present invention, a method for masking, retarding and/or substantially eliminating for an extended period of time, dulling and/or discoloring of a visually observable outer surface of a tire is provided, the method comprising providing a tire having at least one component with a visually observable outer surface, the at least one component comprising a rubber composition comprising (a) at least one rubber component; and (b) an effective amount of at least one substituted or unsubstituted diaryl amine-containing compound having at least one substituted or unsubstituted, saturated or partially saturated $C_5$-$C_{30}$ ring structure optionally containing one or more heteroatoms fused to at least one of the aryl rings.

DESCRIPTION OF THE PREFERRED EMBODIMENTS

Suitable rubber components for use in the rubber compositions of the present invention are based on highly unsaturated rubbers such as, for example, natural and/or synthetic rubbers and mixtures thereof. Representative of highly unsaturated rubbers that can be employed in the practice of this invention are diene rubbers. Such rubbers will ordinarily possess an iodine number of between about 20 to about 450, although highly unsaturated rubbers having a higher or a lower iodine number, e.g., about 50 to about 100, can also be employed. Illustrative of the diene rubbers that can be utilized are polymers based on conjugated dienes such as, for example, 1,3-butadiene; 2-methyl-1,3-butadiene; 1,3-pentadiene; 2,3-dimethyl-1,3-butadiene; and the like, as well as copolymers of such conjugated dienes with monomers such as, for example, styrene, alpha-methylstyrene, acetylene, e.g., vinyl acetylene, acrylonitrile, methacrylonitrile, methyl acrylate, ethyl acrylate, methyl methacrylate, ethyl methacrylate, vinyl acetate, and the like. Preferred highly unsaturated rubbers include natural rubber, polyisoprenes such as cis-polyisoprene, 1,2-polyisoprene and 3,4-polyisoprene, polybutadiene, poly(styrene-butadiene), styrene-isoprene copolymers, isoprene-butadiene copolymers, styrene-isoprene-butadiene terpolymers, polychloroprene, chloro-isobutene-isoprene, nitrile-chloroprene, styrene-chloroprene, and poly(acrylonitrile-butadiene). Moreover, one or more highly unsaturated rubbers combined with elastomers having lesser unsaturation such as terpolymers of ethylene, propylene and a diene (EPDM), copolymers of ethylene and propylene rubbers (EPR), butyl rubbers or halogenated rubbers, e.g., bromo butyl rubbers, rubbers based on benzyl bromo styrene and brominated polymers available from the Exxon Chemical Company under the EXXPRO tradename, are also within the contemplation of the present invention.

Fillers for use in the rubber compositions of the present invention include, but are not limited to, carbon blacks, metal oxides, such as silica (e.g., pyrogenic and precipitated), titanium dioxide, aluminosilicate and alumina, siliceous materials including clays and talc, and the like and mixtures thereof. The term "alumina" can be described herein as aluminum oxide, or $Al_2O_3$. The fillers may be hydrated or in anhydrous form. Useful carbon black fillers include any of the commonly available, commercially-produced carbon blacks known to one skilled in the art. Generally, those having a surface area (EMSA) of at least about 5 $m^2/g$, preferably at least about 35 $m^2/g$ and most preferably at least about 200 $m^2/g$ are preferred. Surface area values used in this application are those determined by ASTM test D-3765 using the cetyltrimethyl-ammonium bromide (CTAB) technique. Among the useful carbon blacks are furnace black, channel blacks and lamp blacks. More specifically, examples of the carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which may be utilized include acetylene blacks and thermal blacks. Mixtures of two or more of the above blacks can be used in preparing the rubber compositions of the invention. Typical values for surface areas of usable carbon blacks are summarized in the following Table 1.

TABLE I

Carbon Blacks

| ASTM Designation (D-1765-82a) | Surface Area ($m^2/g$) (D-3765) |
|---|---|
| N-110 | 126 |
| N-234 | 120 |
| N-220 | 111 |
| N-339 | 95 |
| N-330 | 83 |
| N-550 | 42 |
| N-660 | 35 |

The carbon blacks utilized in the invention may be in pelletized form or an unpelletized flocculant mass. Preferably, for ease of handling, pelletized carbon black is preferred. The carbon blacks are ordinarily incorporated into the rubber composition in an amount ranging from about 10 to about 100 phr, preferably from about 30 to about 90 phr and most preferably from about 45 to about 85 phr. The term "phr" is used herein in its art-recognized sense, i.e., as referring to parts of a respective material per one hundred (100) parts by weight of rubber.

The silica filler may be of any type that is known to be useful in connection with the reinforcing of rubber compositions. Representative of suitable silica fillers include, but are not limited to, silica, precipitated silica, amorphous silica, vitreous silica, fumed silica, fused silica, synthetic silicates such as aluminum silicates, alkaline earth metal silicates such as magnesium silicate and calcium silicate, natural silicates such as kaolin and other naturally occurring silica and the like. Also useful are highly dispersed silicas having, e.g., BET surfaces of from about 5 to about 1000 $m^2/g$ and preferably from about 20 to about 400 $m^2/g$ and primary particle diameters of from about 5 to about 500 nm and preferably from about 10 to about 400 nm. These highly dispersed silicas can be prepared by, for example, precipitation of solutions of silicates or by flame hydrolysis of silicon halides. The silicas can also be present in the form of mixed oxides with other metal oxides such as, for example, Al, Mg, Ca, Ba, Zn, Zr, Ti oxides and the like. Commercially available silica fillers known to one skilled in the art include, e.g., those available from such sources as Cabot Corporation under the Cab-O-Sil® tradename; PPG Industries under the Hi-Sil and Ceptane tradenames; Rhodia under the Zeosil tradename and Degussa AG under the Ultrasil® and Coupsil® tradenames.

When employing a silica filler in the rubber composition of the present invention, it is advantageous to also employ a coupling agent. Such coupling agents, for example, may be premixed, or pre-reacted, with the silica particles or added to the rubber mix during the rubber/silica processing, or mixing, stage. If the coupling agent and silica are added separately to the rubber mix during the rubber/silica mixing, or processing stage, it is considered that the coupling agent then combines in situ with the silica.

Coupling agents are generally composed of a silane which has a constituent component, or moiety, (the silane portion) capable of reacting with the silica surface and, also, a constituent component, or moiety, capable of reacting with the rubber, e.g., a sulfur vulcanizable rubber which contains carbon-to-carbon double bonds, or unsaturation. In this manner, then, the coupling agent acts as a connecting bridge between the silica and the rubber thereby enhancing the rubber reinforcement aspect of the silica.

The silane component of the coupling agent apparently forms a bond to the silica surface, possibly through hydrolysis, and the rubber reactive component of the coupling agent combines with the rubber itself. Generally, the rubber reactive component of the coupling agent is temperature sensitive and tends to combine with the rubber during the final and higher temperature sulfur vulcanization stage, i.e., subsequent to the rubber/silica/coupling mixing stage and after the silane group of the coupling agent has combined with the silica. However, partly because of typical temperature sensitivity of the coupling agent, some degree of combination, or bonding, may occur between the rubber-reactive component of the coupling agent and the rubber during an initial rubber/silica/coupling agent mixing stage and prior to a subsequent vulcanization stage.

Suitable rubber-reactive group components of the coupling agent include, but are not limited to, one or more of groups such as mercapto, amino, vinyl, epoxy, and sulfur groups. Preferably, the rubber-reactive group component of the coupling agent is a sulfur or mercapto moiety with a sulfur group being most preferable.

Examples of a coupling agent for use herein are vinyltrichlorosilane, vinyltrimethoxysilane, vinyltriethoxysilane, vinyltris(β-methoxyethoxy) silane, β-(3,4-epoxycyclohexyl)ethyltrimethoxysilane, γ-glycidoxypropyltrimethoxysilane, γ-glycidoxypropylmethyldiethoxysilane, γ-glycidoxypropyltriethoxysilane, γ-methacryloxypropylmethyldimethoxysilane, γ-methacryloxypropyltrimethoxysilane, γ-methacryloxypropylmethyldiethoxysilane, γ-methacryloxypropyltriethoxysilane, γ-β(aminoethyl)-γ-aminopropylmethyldimethoxysilane, N-β-(aminoethyl)γ-aminopropyltrimethoxysilane, N-β(aminoethyl)γ-aminopropyltriethoxysilane, γ-aminopropyltrimethoxysilane, γ-aminopropyltriethoxysilane, γ-phenyl-γ-aminopropyltrimethoxysilane, γ-chloropropyltrimethoxysilane, γ-mercaptopropyltrimethoxysilane and combinations thereof. Examples of sulfur-containing organo-silicon compounds which may be used herein include, but are not limited to, 3,3'-bis(trimethoxysilylpropyl)disulfide, 3,3'-bis(triethoxysilylpropyl) disulfide, 3,3-bis(triethoxysilylpropyl)tetrasulfide, 3,3'-bis(triethoxysilylpropyl)octasulfide, 3,3'-bis(trimethoxysilylpropyl)tetrasulfide, 2,2'-bis(triethoxysilylethyl)tetrasulfide, 3,3'-bis(trimethoxysilylpropyl)trisulfide, 3,3'-bis(triethoxysilylpropyl)trisulfide, 3,3'-bis(tributoxysilylpropyl)disulfide, 3,3'-bis(trimethoxysilylpropyl)hexasulfide, 3,3'-bis(trimethoxysilylpropyl)octasulfide, 3,3'-bis(trioctoxysilylpropyl)tetrasulfide, 3,3'-bis(trihexoxysilylpropyl)disulfide, 3,3'-bis(tri-2"-ethylhexoxysilylpropyl)trisulfide, 3,3'-bis(triisooctoxysilyipropyl)tetrasulfide, 3,3'-bis(tri-t-butoxysilyl-propyl)disulfide, 2,2'-bis(methoxydiethoxysilylethyl)tetrasulfide, 2,2'-bis(tripropoxysilylethyl)pentasulfide, 3,3'-bis(tricyclohexoxysilylpropyl)tetrasulfide, 3,3'-bis(tricyclopentoxysilylpropyl)trisulfide, 2,2'-bis(tri-2"-methyl-cyclohexoxysilylethyl)tetrasulfide, bis(trimethoxysilylmethyl)tetrasulfide, 3-methoxy ethoxy propoxysilyl 3'-diethoxybutoxy-silylpropyltetrasulfide, 2,2'-bis(dimethyl methoxysilylethyl)disulfide, 2,2'-bis(dimethyl sec.butoxysilylethyl)trisulfide, 3,3'-bis(methylbutylethoxysilylpropyl)tetrasulfide, 3,3'-bis(dit-butylmethoxysilylpropyl)tetrasulfide, 2,2'-bis(phenylmethylmethoxysilylethyl) trisulfide, 3,3'-bis(diphenylisopropoxysilylpropyl) tetrasulfide, 3,3'-bis(diphenyl cyclohexoxysilylpropyl) disulfide, 3,3'-bis(dimethylethylmercaptosilylpropyl) tetrasulfide, 2,2'-bis(methyldimethoxysilylethyl)trisulfide, 2,2'-bis(methyl ethoxypropoxysilylethyl)tetrasulfide, 3,3'-bis(diethylmethoxysilylpropyl)tetrasulfide, 3,3'-bis(ethyldisec butoxysilylpropyl) disulfide, 3,3'-bis(propyldiethoxysilylpropyl)disulfide, 3,3'-bis(butyl dimethoxysilylpropyl) trisulfide, 3,3'-bis(phenyldimethoxysilylpropyl)tetrasulfide, 3-phenylethoxy-butoxysilyl 3'-trimethoxysilyipropyl tetrasulfide, 4,4'-bis(trimethoxysilylbutyl)tetrasulfide, 6,6'-bis(triethoxysilylhexyl)tetrasulfide, 12,12'-bis(triisopropoxysilyldodecyl)disulfide, 18,18'-bis(trimethoxysilyloctadecyl)tetrasulfide, 18,18'-bis(tripropoxysilyloctadecenyl)tetrasulfide, 4,4'-bis(trimethoxy-silylbutene-2-yl)tetrasulfide, 4,4'-bis(trimethoxysilylcyclohexylene)tetrasulfide, 5,5'-bis(dimethoxymethylsilylpentyl)trisulfide, 3,3'-bis(trimethoxy-silyl-2-methylpropyl)tetrasulfide, 3,3'-bis(dimethoxyphenylsilyl-2-methylpropyl)disulfide and the like and mixtures thereof.

In one embodiment, the rubber compositions of the present invention contain an effective amount of a substituted or unsubstituted diaryl amine-containing compound having at least one substituted or unsubstituted, saturated or partially saturated $C_5$-$C_{30}$ ring structure optionally containing one or more heteroatoms fused to at least one of the aryl rings. In one embodiment, the diaryl amine-containing compound can be at least one substituted or unsubstituted diphenyl amine-containing compound having at least one substituted or unsubstituted, saturated or partially saturated $C_5$-$C_{30}$ ring structure optionally containing one or more heteroatoms fused to at least one of the phenyl rings. Generally, the one aryl substituent on the amine atom of the diaryl amine-containing compound contains from 1 to about 5 ring structures while the other aryl substituent on the amine atom contains from 0 to about 6 ring structures. In another embodiment, the diaryl amine-containing compound is represented by the general formula:

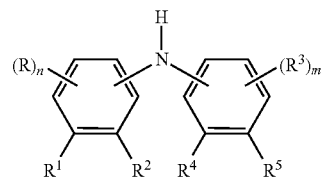

wherein n is from 0 to 3; m is from 0 to 3; each R and $R^3$ substituent is independently hydrogen, a straight or branched $C_1$-$C_{30}$ alkyl group or alkenyl group, substituted or unsubstituted $C_3$-$C_{12}$ cycloalkyl group, substituted or unsubstituted $C_5$-$C_{12}$ aryl group, hydroxyl-containing group, halogen group, substituted or unsubstituted $C_1$-$C_{20}$ alkoxy group, ester-containing group, ether-containing group, polyether-containing group, amide-containing group, or amine-containing group or two R substituents and/or two $R^3$ substituents together with the carbon atom to which they are bonded are joined together to form a substituted or unsubstituted, saturated, partially saturated or unsaturated $C_5$-$C_{30}$ ring structure optionally containing one or more heteroatoms; $R^1$ and $R^2$ together with the carbon atom to which they are bonded are joined together to form a substituted or unsubstituted, saturated or partially saturated $C_5$-$C_{30}$ ring structure optionally containing one or more heteroatoms, and $R^4$ and $R^5$ are independently hydrogen, a straight or branched $C_1$-$C_{30}$ alkyl group or alkenyl group, substituted or unsubstituted $C_3$-$C_{12}$ cycloalkyl group, substituted or unsubstituted $C_5$-$C_{12}$ aryl group, hydroxyl-containing group, halogen group, substituted or unsubstituted $C_1$-$C_{20}$ alkoxy group, ester-containing group, ether-containing group, polyether-containing group, amide-containing group, or amine-containing group or $R^4$ and $R^5$ together with the carbon atom to which they are bonded are joined together to form a substituted or unsubstituted, saturated or partially saturated $C_5$-$C_{30}$ ring structure optionally containing one or more heteroatoms or an isomer thereof.

Representative examples of alkyl groups for use herein include, by way of example, a straight or branched hydrocarbon chain radical containing carbon and hydrogen atoms of from 1 to about 18 carbon atoms with or without unsaturation, to the rest of the molecule, e.g., methyl, ethyl, n-propyl, 1-methylethyl (isopropyl), n-butyl, n-pentyl, etc., and the like.

Representative examples of halogens for use herein include, by way of example, chlorine, bromine, iodine, and the like.

Representative examples of hydroxyl-containing groups for use herein include, by way of example, —OH, a straight or branched hydrocarbon chain radical containing one or more hydroxyl groups bonded to a carbon atom on the hydrocarbon chain, and the like.

Representative examples of ester-containing groups for use herein include, by way of example, a carboxylic acid ester having one to 20 carbon atoms and the like.

Representative examples of ether or polyether containing groups for use herein include, by way of example, an alkyl ether, cycloalkyl ether, cycloalkylalkyl ether, cycloalkenyl ether, aryl ether, arylalkyl ether wherein the alkyl, cycloalkyl, cycloalkylalkyl, cycloalkenyl, aryl, and arylalkyl groups are as defined herein, e.g., alkylene oxides, poly(alkylene oxide)s such as ethylene oxide, propylene oxide, butylene oxide, poly(alkylene oxide)s, poly(ethylene glycol)s, poly(propylene oxide)s, poly(butylene oxide)s and mixtures or copolymers thereof, an ether or polyether group of the general formula —$R_{20}OR_{21}$, wherein $R_{20}$ is a bond, an alkyl, cycloalkyl or aryl group as defined herein and $R_{21}$ is an alkyl, cycloalkyl or aryl group as defined herein and the like.

Representative examples of amide-containing groups for use herein include, by way of example, an amide of the general formula —$R_{23}C(O)NR_{24}R_{25}$ wherein $R_{23}$ can be a $C_1$-$C_{30}$ hydrocarbon, e.g., $R_{23}$ can be an alkylene group, arylene group, cycloalkylene group, and $R_{24}$ and $R_{25}$ can be $R_{24}$ and $R_{25}$ independently hydrogen or a $C_1$-$C_{30}$ hydrocarbon and the like.

Representative examples of amine-containing groups for use herein include, by way of example, an amine of the general formula —$R_{26}NR_{27}R_{28}$ wherein $R_{26}$ is a $C_2$-$C_{30}$ alkylene, arylene, or cycloalkylene and $R_{27}$ and $R_{28}$ are independently hydrogen or a $C_1$-$C_{30}$ hydrocarbon such as, for example, alkyl groups, aryl groups, or cycloalkyl groups as defined herein, and the like.

Representative examples of alkoxy groups for use herein include, by way of example, an alkyl group as defined above attached via oxygen linkage to the rest of the molecule, i.e., of the general formula —$OR_{29}$, wherein $R_{29}$ is an alkyl, cycloalkyl, cycloalkylalkyl, cycloalkenyl, aryl or an arylalkyl as defined herein, e.g., —$OCH_3$, —$OC_2H_5$, or —$OH_5$ which may be substituted or unsubstituted, and the like.

Representative examples of cycloalkyl groups for use herein include, by way of example, a substituted or unsubstituted non-aromatic mono or multicyclic ring system of about 3 to about 18 carbon atoms such as, for example, cyclopropyl, cyclobutyl, cyclopentyl, cyclohexyl, perhydronapththyl, adamantyl and norbornyl groups bridged cyclic group or spirobicyclic groups, e.g., spiro-(4,4)-non-2-yl and the like, optionally containing one or more heteroatoms, e.g., O, S and/or N, and the like.

Representative examples of cycloalkylalkyl groups for use herein include, by way of example, a substituted or unsubstituted cyclic ring-containing radical containing from about 3 to about 18 carbon atoms directly attached to the alkyl group which are then attached to the main structure of the monomer at any carbon from the alkyl group that results in the creation of a stable structure such as, for example, cyclopropylmethyl, cyclobutylethyl, cyclopentylethyl and the like, wherein the cyclic ring can optionally contain one or more heteroatoms, e.g., O, S and/or N, and the like.

Representative examples of cycloalkenyl groups for use herein include, by way of example, a substituted or unsubstituted cyclic ring-containing radical containing from about 3 to about 18 carbon atoms with at least one carbon-carbon double bond such as, for example, cyclopropenyl, cyclobutenyl, cyclopentenyl and the like, wherein the cyclic ring can optionally contain one or more heteroatoms, e.g., O, S and/or N, and the like.

Representative examples of aryl groups for use herein include, by way of example, a substituted or unsubstituted monoaromatic or polyaromatic radical containing from about 5 to about 25 carbon atoms such as, for example, phenyl, naphthyl, tetrahydronapthyl, indenyl, biphenyl and the like, optionally containing one or more heteroatoms, e.g., O, S and/or N, and the like.

Representative examples of arylalkyl groups for use herein include, by way of example, a substituted or unsubstituted aryl group as defined above directly bonded to an alkyl group as defined herein, e.g., —$CH_2C_6H_5$, —$C_2H_5C_6H_5$ and the like, wherein the aryl group can optionally contain one or more heteroatoms, e.g., O, S and/or N, and the like.

Representative examples of heterocyclic ring groups for use herein include, by way of example, a substituted or unsubstituted stable 3 to about 15 membered ring radical, containing carbon atoms and from one to five heteroatoms, e.g., nitrogen, phosphorus, oxygen, sulfur and mixtures thereof. Suitable heterocyclic ring radicals for use herein may be a monocyclic, bicyclic or tricyclic ring system, which may include fused, bridged or spiro ring systems, and the nitrogen, phosphorus, carbon, oxygen or sulfur atoms in the heterocyclic ring radical may be optionally oxidized to various oxidation states. In addition, the nitrogen atom may be optionally quaternized; and the ring radical may be partially or fully saturated (i.e., heteroaromatic or heteroaryl aromatic). Examples of such heterocyclic ring radicals include, but are not limited to, azetidinyl, acridinyl, benzodioxolyl, benzodioxanyl, benzofurnyl, carbazolyl, cinnolinyl, dioxolanyl, indolizinyl, naphthyridinyl, perhydroazepinyl, phenazinyl, phenothiazinyl, phenoxazinyl, phthalazinyl, pyridyl, pteridinyl, purinyl, quinazolinyl, quinoxalinyl, quinolinyl, isoquinolinyl, tetrazoyl, imidazolyl, tetrahydroquinolinyl, tetrahydroisoquinolinyl, piperidinyl, piperazinyl, 2-oxopiperazinyl, 2-oxopiperidinyl, 2-oxopyrrolidinyl, 2-oxoazepinyl, azepinyl, pyrrolyl, 4-piperidonyl, pyrrolidinyl, pyrazinyl, pyrimidinyl, pyridazinyl, oxazolyl, oxazolinyl, oxazolidinyl, triazolyl, indanyl, isoxazolyl, iso-oxazolidinyl, morpholinyl, thiazolyl, thiazolinyl, thiazolidinyl, isothiazolyl, quinuclidinyl, isothiazolidinyl, indolyl, isoindolyl, indolinyl, isoindolinyl, octahydroindolyl, octahydroisoindolyl, quinolyl, isoquinolyl, decahydroisoquinolyl, benzimidazolyl, thiadiazolyl, benzopyranyl, benzothiazolyl, benzooxazolyl, furyl, tetrahydrofurtyl, tetrahydropyranyl, thienyl, benzothienyl, thiamorpholinyl, thiamorpholinyl sulfoxide, thiamorpholinyl sulfone, dioxaphospholanyl, oxadiazolyl, chromanyl, isochromanyl and the like and mixtures thereof.

Representative examples of heteroaryl groups for use herein include, by way of example, a substituted or unsubstituted heterocyclic ring radical as defined herein. The heteroaryl ring radical may be attached to the main structure at any heteroatom or carbon atom that results in the creation of a stable structure.

Representative examples of heteroarylalkyl groups for use herein include, by way of example, a substituted or unsubstituted heteroaryl ring radical as defined above directly bonded to an alkyl group as defined herein. The heteroarylalkyl radical may be attached to the main structure at any carbon atom from the alkyl group that results in the creation of a stable structure.

Representative examples of heterocyclo groups for use herein include, by way of example, a substituted or unsubstituted heterocylic ring radical as defined herein. The heterocyclo ring radical may be attached to the main structure at any heteroatom or carbon atom from the heterocyclo ring that results in the creation of a stable structure.

Representative examples of heterocycloalkyl groups for use herein include, by way of example, a substituted or unsubstituted heterocylic ring radical as defined herein directly bonded to an alkyl group as defined herein. The heterocycloalkyl radical may be attached to the main structure at carbon atom in the alkyl group that results in the creation of a stable structure.

The substituents in the 'substituted alkyl', 'substituted alkoxy', 'substituted cycloalkyl', 'substituted cycloalkylalkyl', 'substituted cycloalkenyl', 'substituted arylalkyl', 'substituted aryl', 'substituted heterocyclic ring', 'substituted heteroaryl ring,' 'substituted heteroarylalkyl', 'substituted heterocycloalkyl ring', 'substituted cyclic ring' and 'substituted carboxylic acid derivative' may be the same or different and include one or more substituents such as hydrogen, hydroxy, halogen, carboxyl, cyano, nitro, oxo (=O), thio (=S), substituted or unsubstituted alkyl, substituted or unsubstituted alkoxy, substituted or unsubstituted alkenyl, substituted or unsubstituted alkynyl, substituted or unsubstituted aryl, substituted or unsubstituted arylalkyl, substituted or unsubstituted cycloalkyl, substituted or unsubstituted cycloalkenyl, substituted or unsubstituted amino, substituted or unsubstituted aryl, substituted or unsubstituted heteroaryl, substituted heterocycloalkyl ring, substituted or unsubstituted heteroarylalkyl, substituted or unsubstituted heterocyclic ring, —COORx, —C(O)Rx, —C(S)Rx, —C(O)NRxRy, —C(O)ONRxRy, —NRxCONRyRz, —N(Rx)SORy, —N(Rx)SO2Ry, —(=N—N(Rx)Ry), —NRxC(O)ORy, —NRxRy, —NRxC(O)Ry—, —NRxC(S)Ry-NRxC(S)NRyRz, —SONRxRy—, —SO$_2$NRxRy—, —ORx, —ORxC(O)NRyRz, —ORxC(O)ORy—, —OC(O)Rx, —OC(O)NRxRy, —RxNRyC(O)Rz, —RxORy, —RxC(O)ORy, —RxC(O)NRyRz, —RxC(O)Rx, —RxOC(O)Ry, —SRx, —SORx, —SO$_2$Rx, —ONO2, wherein Rx, Ry and Rz in each of the above groups can be the same or different and can be a hydrogen atom, substituted or unsubstituted alkyl, substituted or unsubstituted alkoxy, substituted or unsubstituted alkenyl, substituted or unsubstituted alkynyl, substituted or unsubstituted aryl, substituted or unsubstituted arylalkyl, substituted or unsubstituted cycloalkyl, substituted or unsubstituted cycloalkenyl, substituted or unsubstituted amino, substituted or unsubstituted aryl, substituted or unsubstituted heteroaryl, 'substituted heterocycloalkyl ring' substituted or unsubstituted heteroarylalkyl, or a substituted or unsubstituted heterocyclic ring.

Representative examples of ring structures for $R^1$ and $R^2$ and $R^4$ and $R^5$ include independently, cycloalkyl, cycloalkenyl, heterocycloalkyl or heterocycloalkenyl as defined above, the ring structures being optionally substituted with one or more substituents. In one embodiment, each of $R^1$ and $R^2$ and $R^4$ and $R^5$ together with the carbon atom to which they are bonded are joined to form a cyclohexyl ring structure (to form a tetralin ring structure with the phenyl ring to which it is attached).

In another embodiment of the present invention, the diaryl amine-containing compound is represented by the general formula:

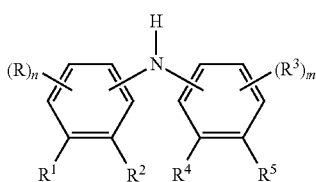

wherein n, m, R and $R^3$ have the aforementioned meanings; $R^1$ and $R^2$ together with the carbon atoms to which they are bonded are joined together to form a substituted or unsubstituted, saturated or partially unsaturated, 5-, 6- or 7-membered ring optionally substituted with one or more heteroatoms and $R^4$ and $R^5$ together with the carbon atoms to which they are bonded are joined together to form a substituted or unsubstituted, saturated or partially unsaturated, 5-, 6-, or 7-membered ring optionally substituted with one or more heteroatoms or an isomer or isomeric mixture thereof. In one preferred embodiment, $R^1$ and $R^2$ together with the carbon atoms to which they are bonded are joined together to form a substituted or unsubstituted, saturated 5-, 6- or 7-membered ring optionally substituted with one or more heteroatoms and $R^4$ and $R^5$ together with the carbon atoms to which they are bonded are joined together to form a substituted or unsubstituted, saturated 5-, 6-, or 7-membered ring optionally substituted with one or more heteroatoms or an isomer or isomeric mixture thereof. In another preferred embodiment, n and m are both 0; $R^1$ and $R^2$ together with the carbon atoms to which they are bonded are joined together to form a substituted or unsubstituted, saturated 5-, 6- or 7-membered ring optionally substituted with one or more heteroatoms and $R^4$ and $R^5$ together with the carbon atoms to which they are bonded are joined together to form a substituted or unsubstituted, saturated 5-, 6-, or 7-membered ring optionally substituted with one or more heteroatoms or an isomer or isomeric mixture thereof. In yet another preferred embodiment, $R^1$ and $R^2$ together with the carbon atoms to which they are bonded are joined together to form a substituted or unsubstituted, saturated 6-membered ring optionally substituted with one or more heteroatoms and $R^4$ and $R^5$ together with the carbon atoms to which they are bonded are joined together to form a substituted or unsubstituted, saturated 6-membered ring optionally substituted with one or more heteroatoms or an isomer or isomeric mixture thereof.

Another embodiment is directed to an isomeric mixture of the diaryl amine-containing compounds for use in the rubber compositions of the present invention. In one embodiment, the isomeric mixture contains at least a 1,1-isomer, 1,2-isomer and a 2,2-isomer of a diaryl amine-containing compound according to the present invention. In another embodiment, the isomeric mixture contains at least a 1,1-isomer, 1,2-isomer and a 2,2-isomer of a diaryl amine-containing compound according to the present invention. Generally, the isomeric mixtures can contain varying amounts of two or more of isomers of the diaryl amine-containing compound according to the present invention. For example, in one embodiment, the isomeric mixture can contain at least varying amounts of at least the 1,1-isomer and the 1,2-isomer. In another embodiment, the isomeric mixture can contain varying amounts of at least the 1,1-isomer and the 2,2-isomer. In another embodiment, the isomeric mixture can contain varying amounts of at least the 1,2-isomer and the 1,2-isomer. In another embodiment, the isomeric mixture can contain varying amounts of at least the 1,1-isomer, 1,2-isomer and the 2,2-isomer.

The foregoing diaryl amine-containing compounds or an isomer or isomeric mixture thereof can be obtained by reacting an amino compound of general formula II:

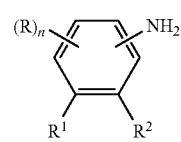

wherein n, R, $R^1$ and $R^2$ have the aforementioned meanings with a phenyl halide of general formula III

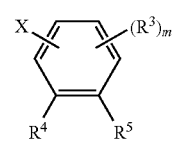

wherein m, $R^3$, $R^4$ and $R^5$ have the aforementioned meanings and X is a halide.

Alternatively, the foregoing diaryl amine-containing compounds or an isomer or isomeric mixture thereof can be obtained by reacting a phenyl halide of general formula IV:

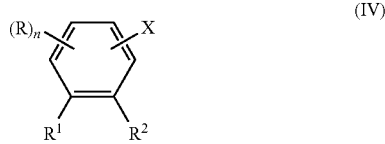

(IV)

wherein n, R, $R^1$ and $R^2$ have the aforementioned meanings and X is a halide with an amino compound of general formula V:

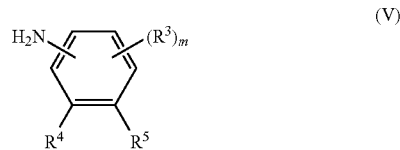

(V)

wherein m, $R^3$, $R^4$ and $R^5$ have the aforementioned meanings. Useful halides include, but are not limited to, bromine, chlorine, iodine, fluorine, etc., with bromine being preferred.

In one embodiment, the diaryl amine-containing compounds or an isomer or isomeric mixture thereof according to the present invention can be obtained by reacting (1) the amino compound of the formula II and the phenyl halide of formula III, or (2) the phenyl halide of formula IV and the amino compound of formula V in the presence of a suitable catalyst. Useful catalysts include, but are not limited to, palladium-containing catalysts, copper-containing catalysts and the like and mixtures thereof. Suitable palladium-containing catalysts include, but are not limited to, tetrakis(triphenylphosphine)palladium, (dibenzylideneacetone)palladium, (dibenzylideneacetate)palladium, (tris(dibenzylideneacetate)dipalladium, bis(tricyclohexylphosphine)palladium, (2-(diphenylphosphino)ethyl)palladium, palladium(0) bis(tri-t-butylphoshine), (1,1'-bis(diphenylphosphino)ferrocene)palladium, bis(triphenylphosphine) dichloropalladium, bis(1,1'-bis(diphenylphosphino) ferrocene)palladium, bis(2-(diphenylphosphino)ethyl)dichloropalladium, $PdCl_2$ $(CH_3CN)_2$ and the like. Suitable copper-containing catalysts include, but are not limited to, $Cu(PPh_3)_3Br$, $CuPPh_3$ (phenantholine) Br, $CuPPh_3$ (1,10-dimethyl phenantholine) Br and the like. The catalyst is present in an amount sufficient to promote the reaction. For example, in one embodiment, the copper-containing catalyst is present in the reaction in an amount ordinarily ranging from about 15 to about 25 wt. %, based on the total weight of the reactants (with no solvent). In another embodiment, the palladium-containing catalyst is present in the reaction in an amount ordinarily ranging from about 1 to about 3 wt. %, based on the total weight of the reactants (with no solvent).

The reaction is advantageously conducted under an inert gas atmosphere such as argon. The temperature for this reaction will ordinarily range from about 80° C. to about 150° C. and more preferably from about 100° C. to about 110° C. Generally, the molar ratio of the amino compound of the formula II to the phenyl halide of formula III can range from about 0.9:1 to about 1:0.9 and preferably from about 0.95:1 to about 1:0.95.

When forming a preferred ditetralin amine compound or an isomer or isomeric mixture thereof, a catalyst, e.g., $Cu(PPh_3)_3$ Br, with a base, tetralin amine (e.g., of formula II) and a solvent, e.g., diethyl ethylene glycol, are charged into an argon flushed reaction vessel. The reaction material can be heated with stirring to a suitable temperature, e.g., about 110° C., for a suitable time, e.g., about 15 minutes, while maintained under an argon atmosphere. The reaction temperature can be lowered, e.g., to about 60° C., and a tetralin halide (e.g., of formula III) is then charged. The temperature is then raised, e.g., to about 110° C., and held for a suitable time, e.g., about 72 hours. The reaction is then cooled to, for example, about 60° C., and diluted with hexanes to precipitate out the salts which are removed by conventional techniques, e.g., filtration. If desired, the filtered solution can then be concentrated and placed on a preparative Silica-Gel column using, for example, hexanes, as the column solvent to isolate the ditetralin amine product.

In another embodiment, a diaryl amine-containing compound or an isomer or isomeric mixture thereof can be obtained by treating an amino compound of the formula II with a Lewis acid. Suitable Lewis acid catalysts include, but are not limited to iron halide ($FeX_n$), titanium halide ($TiX_n$), titanium alkoxide ($Ti(OR)_4$), titanium oxide ($TiO_2$), aluminum halide ($AlX_3$), aluminum alkoxide ($Al(OR)_3$), tin halide ($SnX_n$), boron trihalide ($BX_3$), magnesium halide ($MgX_2$) and zinc halide ($ZnX_2$). Alternatively, aluminum oxide may be used as a catalyst. The catalyst is present in the reaction in an amount ordinarily ranging from about 0.1 to about 50% by weight and preferably from about 2 to 20% by weight, based on the weight of the reactants.

The catalyst can be used in the form of a fixed bed in the reactor or, for example, in the form of a fluidized bed and can have an appropriate shape. Suitable shapes include, for example, granules, pellets, monoliths, spheres or extrudates.

In this process, it may not be necessary to use a reaction solvent. The reaction is carried out at a temperature ranging from about 300° C. to about 550° C. and preferably from about 350° C. to about 400° C.

Diphenyl amine can be made in a process involving the nitration of benzene to nitrobenzene followed by reduction to aniline. This aniline intermediate is then sent through a fixed bed reactor, at elevated temperatures, containing a solid acidic catalyst which converts the aniline to diphenyl amine and ammonia. It is envisioned that ditetralin amine may be made in a similar process by substituting tetralin for benzene.

Generally, the diaryl amine-containing compound or an isomer or isomeric mixture thereof will be present in the rubber compositions of the present invention in an amount ranging from about 0.5 phr to about 8.0 phr, preferably about 0.5 phr to about 6.0 phr, and most preferably from about 0.75 phr to about 2.0 phr.

While not wishing to be bound by any particular theory, it is believed that when one or more of the diaryl amine-containing compounds is used in combination with one or more antidegradant, a synergistic effect may be obtained in further improving properties such as increased resistance to oxidation, ozone, flex-fatigue, crack-growth failures and the like. Representative examples of such antidegradants include, but are not limited to, phenols and hindered phenols such as styrenated phenol, 2,2'-methylene-bis(4-methyl-6-tert-butylphenol), 4,4'-thiobis(6-tert-butyl-m-cresol) and the like and mixtures thereof; alkylated diphenylamines such as dioctyldiphenylamine, 4,4'-di(1-methyl-1-phenylpropyl)diphenylamine, dinonyldiphenylamines and the like and mixtures thereof; quinolines such as polymerized 1,2-dihydro-2,2,4-trimethylquinoline, 6-ethoxy-1,2-dihydro-2,2,4,trimethylquinoline and the like and mixtures thereof; alkylated hydroquinones such as 2,5-di(tert-amyl)hydroquinone and the like and mixtures thereof; N,N'-bis(alkyl)-para-phenylenediamines such as N,N'-bis(1,4-dimethylpentyl)-para-phenylenediamine and the like and mixtures thereof; N,N'-bis(aryl)-para-phenylenediamines such as N,N'-bis(phenyl)-para-phenylenediamine and the like and mixtures thereof; N-(alkyl)-N'-(aryl)-para-phenylenediamines such as N-(1,3-dimethylbutyl)-N'-phenyl-para-phenylenediamine and the like and mixtures thereof; quinonediimines such as N-(1,3-dimethylbutyl)-N'-phenyl-quinonediimine and the like and mixtures thereof; thioesters such as dilauryl thiodipropionate, pentaerythritoltetrakis(3-(dodecylthio)propionate) and the like and mixtures thereof; phosphites such as tris(nonylphenyl) phosphite and the like and mixtures thereof; imidazoles such as 2-mercaptotoluimidazole and its salts such as zinc and the like and mixtures thereof; naphthylamines and alkylated naphthylamines such as N-phenyl-alpha-naphthylamine and the like and mixtures thereof; triazines such as 2,4,6-tris(N-(1,4-dimethylpentyl)-para-phenylenediamino)-1,3,5-triazine and the like and mixtures thereof. Generally, the amount of antidegradant will range from about I to about 5 phr.

The rubber compositions of this invention are formulated in any conventional manner known in the rubber compounding art with various commonly used additive materials, as necessary. For example, the diaryl amine-containing compounds can be combined with one or more commonly used additives such as curing aids; activators; antireversion agents; retarders; accelerators; sulfur donors, prevulcanization retarders, processing additives, e.g., oils; tackifying resins; plasticizers; pigments; fatty acids; zinc oxide; waxes; antioxidants; antiozonants; peptizing agents; reinforcing materials and the like and combinations thereof. Depending on the intended use of the rubber composition, the additives mentioned above are selected and commonly used in conventional amounts.

Generally, accelerators are used to control the time and/or temperature required for vulcanization and to improve the properties of the vulcanizate. In one embodiment, a single accelerator system is used, i.e., a primary accelerator. In one embodiment, a primary accelerator(s) is used in an amount ranging from about 0.5 to about 4 phr. In another embodiment, a primary accelerator(s) is used in an amount ranging from about 0.8 to about 1.5 phr. Combinations of a primary and a secondary accelerator can also be used with the secondary accelerator being employed in smaller amounts (e.g., about 0.05 to about 3 phr) in order to activate and to improve the properties of the vulcanizate. Delayed action accelerators may also be used. Vulcanization retarders may also be used. Suitable types of accelerators are, for example, benzothiazole sulfenamides, 2-mercaptobenzothiazole, disulfides derived from 2-mercaptobenzothiazole, tetraalkyl thiuram mono, di, and polysulfides, dithiocarbamates, and guanidines. In one embodiment, the primary accelerator is a sulfenamide. If a second accelerator is used, the secondary accelerator may be a guanidine, dithiocarbamate, or thiuram compound.

Suitable sulfur donors include, but are not limited to, 4,4'dithiomorpholine and the like. Suitable antireversion agents include, but are not limited to, 1,3-bis(citraconimidomethyl)benzene, metaphenylene bis(maleimide), hexamethylene-1,6-bisthiosulfate disodium salt dihydrate and the like and mixtures thereof.

Generally, the tackifier resin is present in an amount ranging from about 0.5 to about 10 phr. In a second embodiment, the amount of tackifier resin will range from about 1to about 5 phr.

Suitable processing aids include, but are not limited to, aromatic, naphthenic, and/or paraffinic processing oils. The amount of processing aids will range from about 1 to about 50 phr.

Suitable prevulcanization inhibitors include, but are not limited to, N-(cyclohexylthio)phthalimide and the like.

The amount of fatty acid, e.g., stearic acid, will range from about 0.5 to about 3 phr. The amount of zinc oxide will range from about 2 to about 5 phr. The amount of wax will range from about I to about 5 phr. Suitable peptizers include, but are not limited to, pentachlorothiophenol and dibenzamidodiphenyl disulfide. The amount of peptizer will range from about 0.1 to about 1 phr.

If desired, the vulcanization can be conducted in the presence of a sulfur-vulcanizing agent. Examples of suitable sulfur-vulcanizing agents include elemental sulfur (free sulfur) or sulfur donating vulcanizing agents, for example, an amine disulfide, polymeric polysulfide or sulfur olefin adducts, with elemental sulfur being preferred. The sulfur-vulcanizing agents will be present in an amount ranging from about 0.5 to about 4 phr, or even, in some circumstances, up to about 8 phr. However, the typical range is from about 1.5 to about 3.5 phr, and preferably from about 2 to about 2.5 phr.

The rubber compositions of this invention are particularly useful when used in a tire as a component having a visually exposed surface of any or all portions of the tire. Such tire components having visually exposed surfaces are, for example, tire sidewalls, tire chafers, and tire treads, or individual portions thereof intended for, but not exclusive to, a truck tire, passenger tire, off-road vehicle tire, vehicle tire, high speed tire, bicycle tire and motorcycle tire that can contain many different reinforcing layers therein. Such rubber or tire compositions in accordance with the present invention may be used for the manufacture of tires or for the re-capping of worn tires. The rubber compositions of this invention are also useful when used as a carcass component in a tire, e.g., a truck tire.

The following non-limiting examples are illustrative of the present invention.

Example 1

Preparation of Ditetralin Amine Using Copper Coupling Catalyst

Into a warm dry 50 ml four neck reaction flask equipped with a mechanical stirrer, thermal couple, heating mantle, Argon blanket and septum injection port was charged $Cu(PPh_3)_3$ Br (5.0 g) catalyst and potassium butoxide (4.5 g). The vessel was now well flushed with argon gas and maintained under a dry argon blanket. Into the reaction vessel was injected a degassed 30 ml diethyl ethylene glycol solution containing tetralin amine (5.0 g).

The reaction mixture was heated, under argon with stirring, to 110° C. and held for 15 minutes before being cooled back down to 30° C. A second solution of bromotetralin (8.0 g) in 5 ml of diethyl ethylene glycol was now injected into the reaction vessel. The temperature was now raised to 105° C. and held for 72 hours with stirring under an argon blanket. The bromo and amino tetralins maybe the pure 1 or 2-tetralin isomer or isomer mixtures of the two. In this example, a mixture of 1 and 2-bromotetralin was used.

The reaction was then cooled to room temperature and diluted in 200 ml of hexanes to precipitate out any insoluble salts. This material was then filtered to remove any unwanted salts and the solution was concentrated down to 50 ml on a roto-evaporator. The hexane concentrate was passed through a silica gel column using hexane as the column solvent to isolate the tetralin product. The process of running a silica gel column may be repeated several times to isolate a pure product. The product was isolated as 3 to 4 grams of a yellow viscous liquid which may solidify on standing and melts above 40° C.

Example 2

Preparation of Ditetralin Amine Using Palladium Coupling Catalyst

Into a 50 ml reaction vessel equipped with a mechanical stirrer, thermocouple, heating mantle and an argon blanket was charged powdered sodium t-butoxide (8.7 g, 0.087 mol). To this reaction vessel was now charged a dry argon degassed solution of bromotetralin (9.6 g, 0.045 mol), aminotetralin (7.4 g, 0.050 mol), tris(dibenzylideneacetone)dipalladium (0.18 g, 0.00020 mol) and RAC-2,2'-bis-(diphenylphosphineo)-1,1'-bi-naphthyl (0.24 g, 0.00040 mol) in 25 ml of xylene. The reaction mixture was stirred vigorously under an argon atmosphere raising the temperature to 115° C. and holding these conditions for 20 hours. The reaction media was then cooled to room temperature and diluted with 100 ml of hexane and allowed to stand for one hour before being filtered. The filtered solution was then washed with 1×50 ml of 5% aqu. sodium hydroxide, 1×50 ml of 5% aqu. sodium bicarbonate and 1×50 ml of water, dried over anhydrous magnesium sulfate and filtered. The solution was concentrated to 75 ml and passed through a 50×50 mm chromatography column of silica gel using hexane as the column solvent. The hexane and xylene solvent was then stripped off under vacuum. The final product was a yellow-orange viscous liquid weighing 7.5 g.

Example 3

Preparation of Ditetralin Amine Using Thermal Hot Tube Coupling over Solid Lewis Acid Catalyst Tetralin amine can be converted to di-tetralin amine using a process similar to the commercial process of converting aniline to diphenyl amine (DPA). This process involves converting tetralin amine to ditetralin amine by passing tetralin amine through a fixed bed reactor, in this example a ⅜'s inch (0.009525 meter) glass tube, at 300 to 500° C. containing aluminum oxide or zeolite lewis acid pellet catalysts.

To hold the catalyst in a vertical glass tube, a half inch glass wool plug was inserted in the glass tube a little less than half way up the tube. The catalyst was then poured down the top of the tube to the desired amount. Crushed glass, 25 to 50 mesh, was then poured down the top of the tube to the desired amount. The crushed glass was also added on top of the catalyst to help maintain the tetralin amine in the gas phase before it comes in contact with the catalyst.

The glass tube containing a one inch loading of catalyst was placed vertically in the middle of the furnace. The top and bottom of the furnace was closed off with the ceramic tile plates by sliding the glass tube through the hole in the ceramic plates. On top of the glass tube was placed the "T" tube with septum to insert a steel syringe needle and nitrogen gas inlet.

The solid catalysts can be either used in the bead or pellet form or ground down to the 25 to 50 mesh size. The catalyst was first pre-conditioned with only the nitrogen gas connected to the top of the glass tube, the nitrogen flow was set at 55 ml/min through the tube. The furnace was now turned on and heated to 500 to 550° C. The temperature and nitrogen flow rate were maintained for 18 hours. After 18 hours, the temperature was reset to the temperature desired for the experiment to begin.

In this experiment, the catalyst used will be 25 to 50 mesh aluminum oxide and the furnace temperature will be set at 360° C. The syringe, pre-filled with tetralin amine, was connected to the syringe pump and the steel needle inserted in the top of the "T" tube septum far enough such that the tip of the needle was one inch above the entrance of the furnace. The nitrogen flow rate was now reset to 10 to 15 ml/min. for this experiment. The syringe pump flow rate was also set to 0.34 ml/hr for the tetralin amine injection rate. The syringe pump was now started. After several hours, a sample of the product exiting the bottom of the glass tube was taken and analyzed by gas chromatography (GC) and found to contain 3 to 4% ditetralin amine. The remainder of the product was mostly starting tetralin amine.

Example 4 and Comparative Examples A-F

Employing the ingredients indicated in Table II (which are listed in parts per hundred of rubber by weight), several rubber compositions were compounded in the following manner.

The rubber polymer, carbon black filler, and oil were mixed in a Banbury 1A internal mixer to make a masterbatch. Portions of this masterbatch were taken and zinc oxide, stearic acid, and the antidegradant test materials were mixed in a Brabender lab mixer. The rubber compounds were sheeted on a warm mill and sulfur and an accelerator mixed in a Brabender lab mixer.

TABLE II

| | Ex./Comp. Ex. | | | | | | |
|---|---|---|---|---|---|---|---|
| Ingredients | 4 | A | B | C | D | E | F |
| Natsyn 2200[1], IR | 100.0 | 100.0 | 100.0 | 100.0 | 100.0 | 100.0 | 100.0 |
| N-330[2], carbon black | 50.0 | 50.0 | 50.0 | 50.0 | 50.0 | 50.0 | 50.0 |
| Stearic Acid | 2.5 | 2.5 | 2.5 | 2.5 | 2.5 | 2.5 | 2.5 |
| Kadox 911[3] | 4.0 | 4.0 | 4.0 | 4.0 | 4.0 | 4.0 | 4.0 |
| Flexzone 7P[4] | | | 2.0 | | | | |
| Naugard 445[5] | | | | 2.0 | | | |
| Lowinox 22M46[6] | | | | | 2.0 | | |
| Ditetralin Amine[7] | 2.0 | | | | | | |
| Octamine[8] | | | | | | 2.0 | |
| Durazone 37[9] | | | | | | | 2.0 |
| Delac NS[10] | 1.0 | 1.0 | 1.0 | 1.0 | 1.0 | 1.0 | 1.0 |
| Insoluble Sulfur, 80% | 3.0 | 3.0 | 3.0 | 3.0 | 3.0 | 3.0 | 3.0 |

[1]Natsyn 2200 is a cis polyisoprene rubber available from Goodyear.
[2]N-330 is a carbon black filler available from Cabot Corp.
[3]Kadox 911 is zinc oxide available from Zinc Corporation of America.
[4]Flexzone 7P is a N-(1,3-dimethylbutyl)-N'-phenyl-p-phenylenediamine available from Chemtura Corporation.
[5]Naugard 445 is a 4,4'-di(1-methyl-1-phenylpropyl)diphenylamine available from Chemtura Corporation.
[6]Lowinox 22M46 is a 2,2'-Methylene-bis(4-methyl-6-tert-butylphenol) available from Chemtura Corporation.
[7]Ditetralin amine is the product from Example 2.
[8]Octamine is a dioctyldiphenylamine available from Chemtura Corporation.
[9]Durazone 37 is a 2,4,6-tris(N-(1,4-dimethylpentyl)-p-phenylenediamino)-1,3,5-triazine available from Chemtura Corporation.
[10]Delac NS is a vulcanization accelerator, N-tert-butyl-2-benzothiazolylsulfenamide available from Chemtura Corporation.

Results

The compounded stocks prepared above were then sheeted out and cut for cure. The samples were cured for the times and at the temperatures indicated in Table III and their physical properties evaluated. The results are summarized in Table III below. Note that in Table III, cure characteristics were determined using a Monsanto rheometer ODR 2000 (1° ARC, 100 cpm) according to ASTM D2084-92; MH is the maximum torque and ML is the minimum torque. Scorch safety (ts2) is the time required for the torque to rise 2 units above minimum torque (ML), cure time (t(50)) is the time required to attain 50% of delta torque above minimum and cure time (t(90)) is the time required to attain 90% of delta torque above minimum. Tensile Strength, Elongation and Modulus were measured following procedures in ASTM D412-92. The results of the Hardness tests were measured following procedures in ASTM D2240-91.

Heat ageing was carried out in hot air ovens at the temperatures and time conditions shown in the Table III.

Ozone resistance was tested using the Dynamic Ozone Belt Test (according to ASTM D3395 Method B) by vulcanizing test specimens on a belt. This belt was continuously flexed at 40° C. in an ozone chamber in an ozone concentration of 50 parts per hundred million. At the times indicated in Table III, the specimens were examined and rated according to the number and severity of the cracks formed, with a rating of 10 corresponding to no cracking and a rating of 1 corresponding to very severe cracking. At the end of the test, the specimens were also examined and the relative amount and color of the surface bloom was assessed.

TABLE III

| | Ex./Comp. Ex. | | | | | | |
|---|---|---|---|---|---|---|---|
| | 4 | A | B | C | D | E | F |
| Rheometer Properties MDR @ 150° C./30 Minutes | | | | | | | |
| Torque, ML (in-lb) | 2.99 | 2.84 | 3.16 | 2.99 | 2.33 | 2.99 | 2.95 |
| Torque, MH (in-lb) | 34.41 | 37.62 | 32.93 | 35.66 | 32.92 | 34.9 | 34.17 |
| Delta Torque | 31.42 | 34.78 | 29.77 | 32.67 | 30.59 | 31.91 | 31.22 |
| ts2 (min) (time to a 2 point rise) | 2.34 | 1.99 | 1.87 | 2.24 | 1.55 | 2.32 | 2.37 |
| t(50) (min) (time to 50% cure) | 6.89 | 6.6 | 5.58 | 7.04 | 5.64 | 7.11 | 6.08 |
| t(90) (min) (time to 90% cure) | 13.63 | 11.84 | 14.65 | 12.83 | 13.12 | 13.36 | 11.83 |
| Slope | 2.30 | 2.95 | 1.92 | 2.56 | 2.19 | 2.39 | 2.73 |
| Peak Rate (in-lb/sec) | 0.11 | 0.13 | 0.13 | 0.11 | 0.12 | 0.11 | 0.14 |
| Stress-Strain Tests Physical Properties | | | | | | | |
| Cure time at 150° C. (min) | 16 | 14 | 18 | 16 | 16 | 16 | 14 |
| A. Original | | | | | | | |
| Hardness, Shore A | 65 | 67 | 64 | 64 | 65 | 67 | 64 |
| M(100), psi (modulus at 100% elongation) | 507 | 549 | 532 | 537 | 509 | 500 | 506 |
| M(300), psi (modulus at 300% elongation) | 2303 | 2521 | 2410 | 2440 | 2365 | 2360 | 2250 |
| Tensile Strength (psi) | 4084 | 4082 | 3915 | 4042 | 4089 | 4082 | 3874 |
| Elongation, % at Break | 481 | 456 | 449 | 458 | 473 | 472 | 471 |
| B. Heat Aging, 7 days at 70° C. | | | | | | | |
| Hardness | 70 | 69 | 69 | 70 | 72 | 70 | 71 |
| M(100), psi | 645 | 638 | 654 | 651 | 649 | 647 | 627 |
| M(300), psi | 2725 | 2764 | 2849 | 2831 | 2885 | 2850 | 2646 |
| Tensile Strength (psi) | 3922 | 3125 | 3680 | 3923 | 3999 | 3902 | 3676 |
| Elongation, % at Break | 427 | 338 | 379 | 409 | 415 | 404 | 410 |
| Hardness, pts. | 5 | 2 | 5 | 6 | 7 | 3 | 7 |
| M(100), % | 27% | 16% | 23% | 21% | 28% | 29% | 24% |
| M(300), % | 18% | 10% | 18% | 16% | 22% | 21% | 18% |
| Tensile Strength, % | −4% | −23% | −6% | −3% | −2% | −4% | −5% |
| Elongation, % at Break | −11% | −26% | −16% | −11% | −12% | −14% | −13% |
| C. Heat Aging, 14 days at 70° C. | | | | | | | |
| Hardness | 71 | 67 | 71 | 70 | 72 | 70 | 70 |
| M(100), psi | 681 | 637 | 721 | 715 | 683 | 709 | 699 |
| M(300), psi | 2822 | — | 3012 | 2987 | 2968 | 2973 | 2854 |
| Tensile Strength (psi) | 3827 | 2630 | 3624 | 3775 | 3509 | 3650 | 3600 |
| Elongation, % at Break | 406 | 294 | 358 | 378 | 354 | 369 | 377 |
| Hardness, pts. | 6 | 0 | 7 | 6 | 7 | 3 | 6 |
| M(100), % | 34% | 16% | 36% | 33% | 34% | 42% | 38% |
| M(300), % | 23% | — | 25% | 22% | 25% | 26% | 27% |
| Tensile Strength, % | −6% | −36% | −7% | −7% | −14% | −11% | −7% |
| Elongation, % at Break | −16% | −36% | −20% | −17% | −25% | −22% | −20% |
| D. Heat Aging, 21 days at 70° C. | | | | | | | |

TABLE III-continued

|  | Ex./Comp. Ex. | | | | | | |
|---|---|---|---|---|---|---|---|
|  | 4 | A | B | C | D | E | F |
| Hardness | 72 | 68 | 73 | 72 | 69 | 70 | 72 |
| M(100), psi | 700 | 605 | 747 | 715 | 739 | 726 | 731 |
| M(300), psi | 2886 | — | 3050 | 2965 | 2522 | 3082 | 2941 |
| Tensile Strength (psi) | 3783 | 1680 | 3597 | 3302 | 3087 | 3136 | 3695 |
| Elongation, % at Break | 395 | 214 | 353 | 333 | 306 | 307 | 382 |
| Hardness, pts. | 7 | 1 | 9 | 8 | 4 | 3 | 8 |
| M(100), % | 38% | 10% | 40% | 33% | 45% | 45% | 44% |
| M(300), % | 25% | — | 27% | 22% | 7% | 31% | 31% |
| Tensile Strength, % | −7% | −59% | −8% | −18% | −25% | −23% | −5% |
| Elongation, % at Break | −18% | −53% | −21% | −27% | −35% | −35% | −19% |
| DeMattia Flex, Crack growth propagation to 0.5-in failure | | | | | | | |
| Kcycles, Unaged | 132.7 | 17.04 | 19.91 | 127.5 | 64.05 | 127.5 | 18.12 |
| Flex-Fatigue, 100% strain, Kc to failure | | | | | | | |
| Unaged | 81.27 | 37.58 | 97.71 | 57.08 | 74.73 | 57.53 | 43.93 |
| 14 days @ 70° C. | 67.43 | 15.50 | 52.35 | 54.80 | 47.07 | 43.23 | 19.95 |
| change, % | −17% | −59% | −46% | −4% | −37% | −25% | −55% |
| Dynamic Ozone Belt Test, 50+ pphm (parts per hundred million) @ 40° C., 300+ hours exposure | | | | | | | |
| 26 hours | 10.0 | 10.0 | 10.0 | 10.0 | 10.0 | 10.0 | 9.5 |
| 50 | 10.0 | 10.0 | 10.0 | 10.0 | 10.0 | 10.0 | 9.0 |
| 75 | 10.0 | 9.0 | 10.0 | 10.0 | 10.0 | 10.0 | 8.0 |
| 100 | 10.0 | 8.0 | 9.5 | 10.0 | 10.0 | 10.0 | 6.0 |
| 123 | 10.0 | 7.0 | 9.0 | 9.5 | 10.0 | 9.0 | 4.0 |
| 147 | 10.0 | 6.5 | 9.0 | 9.0 | 10.0 | 8.0 | 3.5 |
| 171 | 10.0 | 6.0 | 9.0 | 8.5 | 10.0 | 7.0 | 3.0 |
| 195 | 9.5 | 4.0 | 9.0 | 8.5 | 9.5 | 7.0 | 3.0 |
| 218 | 9.0 | 3.0 | 9.0 | 8.0 | 9.0 | 6.5 | 2.0 |
| 242 | 9.0 | 2.5 | 9.0 | 7.0 | 9.0 | 6.0 | 2.0 |
| 267 | 8.5 | 1.5 | 8.5 | 6.5 | 8.0 | 4.0 | 1.5 |
| 292 | 8.5 | 1.0 | 8.5 | 5.0 | 7.0 | 3.0 | 1.0 |
| 315 | 8.5 | 1.0 | 8.0 | 4.0 | 7.0 | 2.5 | 1.0 |
| 340 | 8.0 | 1.0 | 8.0 | 4.0 | 7.0 | 2.0 | 1.0 |
| 366 | 8.0 | 1.0 | 8.0 | 3.0 | 7.0 | 2.0 | 1.0 |
| 394 | 7.5 | 1.0 | 8.0 | 3.0 | 6.5 | 2.0 | 1.0 |
| 10 = no cracks, 1 = very severe crack | | | | | | | |
| Surface bloom - color | none black blue | none black | Heavy red brown | none black | none black | none black | none black grey |
| Gloss Index Rating, dynamic ozone belt samples | | | | | | | |
| Unaged | 58.6 | 45.5 | 54.3 | 60.7 | 51.1 | 54.1 | 45.6 |
| After 394 hours | 13.7 | 14.7 | 1.8 | 12.6 | 23.3 | 13.1 | 22.2 |
| Change, % | −77% | −68% | −97% | −79% | −54% | −76% | −51% |

As can be seen from the data in Table III, a balance of ozone protection and desirable surface appearance is achieved when employing a diaryl amine-containing compound in the rubber composition of Example 4 as compared to the use of phenylenediamine in the rubber composition of Comparative Example B. For example, the rubber composition of Example 4 had a rating of 7.5 according to the Dynamic Ozone Belt Test, a surface bloom of none while having a color of black and blue after 394 hours whereas the rubber composition of Comparative Example B had a rating of 8 according to the Dynamic Ozone Belt Test, a surface bloom of heavy while having a color of red and brown after 394 hours. A coloration of black and blue is indicative of a shiny surface as compared to a red and brown color which is indicative of discoloring bloom. Thus, the rubber composition of Example 4 achieved a balance of both ozone protection and surface appearance. In addition, the rubber composition of Example 4 when subjected to heat aging (which correlates to degradation for a carcass) possessed a relatively improved tensile strength and elongation at break after 21 days as compared to the rubber compositions of Comparative Examples A through F.

It will be understood that various modifications may be made to the embodiments disclosed herein. Therefore the above description should not be construed as limiting, but merely as exemplifications of preferred embodiments. For example, the functions described above and implemented as the best mode for operating the present invention are for illustration purposes only. Other arrangements and methods may be implemented by those skilled in the art without departing from the scope and spirit of this invention. Moreover, those skilled in the art will envision other modifications within the scope and spirit of the claims appended hereto.

What is claimed is:

1. A tire having at least one component with a visually observable outer surface, the at least one component comprising a first rubber composition comprising (a) one or more of a first rubber component; and (b) an effective amount of one or more of a first diaryl amine-containing compound represented by the general formula:

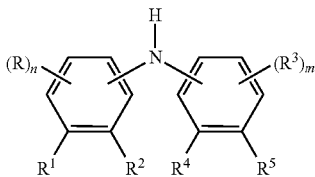

wherein n is from 0 to 3; m is from 0 to 3; each R and $R^3$ substituent is independently hydrogen, a straight or branched $C_1$-$C_{32}$ alkyl group or alkenyl group, substituted or unsubstituted $C_3$-$C_{12}$ group, substituted or unsubstituted $C_5$-$C_{12}$ aryl group, hydroxyl-containing group, halogen group, substituted or unsubstituted $C_1$-$C_{20}$ alkoxy group, ester-containing group, ether-containing group, polyether-containing group, amide-containing group, or amine-containing group or two R substituents and/or two $R^3$ substituents together with the carbon atom to which they are bonded are joined together to form a substituted or unsubstituted, saturated, partially saturated or unsaturated $C_5$-$C_{30}$ ring structure optionally containing one or more heteroatoms;

$R^1$ and $R^2$ together with the carbon atom to which they are bonded are joined together to form a substituted or unsubstituted ring, and $R^4$ and $R^5$ together with the carbon atom to which they are bonded are pined together to form a substituted or unsubstituted $C_5$-$C_{30}$ cycloalkyl or cycloalkenyl ring.

2. The tire of claim 1, wherein the first rubber component is selected from the group consisting of a natural rubber, homopolymer of a conjugated diolefin, copolymer of a conjugated diolefin and an ethylenically unsaturated monomer and mixtures thereof.

3. The tire of claim 1, wherein the first rubber component is selected from the group consisting of a natural rubber, polyisoprene, polybutadiene, polystyrene-butadiene), styrene-isoprene copolymer, isoprene-butadiene copolymer, styrene-isoprene-butadiene terpolymer, polychloroprene, chloro-isobutene-isoprene, nitrile-chloroprene, styrene-chloroprene, poly (acrylonitrile-butadiene), ethylene-propylene-diene terpolymer and mixtures thereof.

4. The tire of claim 1, where in the first diaryl amine-containing compound, $R^1$ and $R^2$ together with the carbon atom to which they are bonded are joined together to form a substituted or unsubstituted, 5, 6- or 7-membered cycloalkyl or cycloalkenyl ring.

5. The tire of claim 4, where in the first diaryl amine-containing compound, R and $R^3$ are hydrogen.

6. The tire of claim 1, where in the first diaryl amine-containing compound, $R^1$ and $R^2$ together with the carbon atom to which they are bonded are joined together to form a substituted or unsubstituted 5, 6- or 7-membered cycloalkyl or cycloalkenyl ring and $R^4$ and $R^5$ together with the carbon atom to which they are bonded are joined together to form a substituted or unsubstituted 5-, 6- or 7-membered cycloalkyl or cycloalkenyl ring.

7. The tire of claim 6, wherein the first rubber component is a natural rubber.

8. The tire of claim 1, wherein the first diaryl amine-containing compound of component (b) is present in the rubber composition in an amount of about 0.5 to about 8.0 parts per hundred parts by weight of rubber (phr).

9. The tire of claim 1, wherein the first rubber composition further comprises at least one reinforcing filler.

10. The tire of claim 9, wherein the reinforcing filler is carbon black, silica or both.

11. The tire of claim 10, wherein the reinforcing filler is silica and the rubber composition further comprises at least one coupling agent.

12. The tire of claim 1, wherein the first rubber composition further comprises one or more of a first antidegradant.

13. The tire of claim 1, wherein the first rubber composition further comprises at least one compound selected from the group consisting of a phenol, hindered phenol, alkylated diphenylamine, 1,2-dihydro-2,2,4-trimethylquinoline, alkylated hydroquinone, N,N'-bis(alkyl)-para-phenylenediamine, N,N'-bis(aryl)-para-phenylenediamine, N-(alkyl)-N'-(aryl)-para-phenylenediamine, quinonediimine, thioester, phosphite, imidazole, naphthylamine, alkylated naphthylamine, triazine and combinations thereof.

14. The tire of claim 1, wherein the at least one component is selected from at least a portion of a tire tread, tire sidewall or tire chafer or combination thereof.

15. The tire of claim 1, wherein the at least one component is at least a portion of a tire sidewall to the exclusion of a tire tread.

16. The tire of claim 7, wherein the at least one component is at least a portion of a tire sidewall to the exclusion of a tire tread.

17. The tire of claim 13, wherein the at least one component is at least a portion of a tire sidewall to the exclusion of a tire tread.

18. The tire of claim 1, further comprising a carcass, the carcass comprising a second rubber composition comprising (a) one or more of a second rubber component; and (b) an effective amount of one or more of a second substituted or unsubstituted diaryl amine-containing compound represented by the general formula:

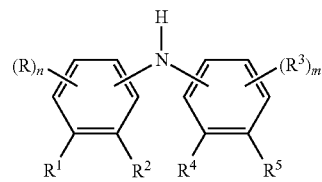

wherein n is from 0 to 3; m is from 0 to 3; each R and $R^3$ substituent is independently hydrogen, a straight branched $C_1$-$C_{32}$ alkyl group or alkenyl group, substituted or unsubstituted $C_3$-$C_{12}$ cycloalkyl group, substituted or unsubstituted $C_5$-$C_{12}$ aryl group, hydroxyl-containing group, halogen group, substituted or unsubstituted $C_1$-$C_{20}$ alkoxy group, ester-containing group, ether-containing group, polyether-containing group, amide-containing group, or amine-containing group or two R substituents and/or two $R^3$ substituents together with the carbon atom to which they are bonded are joined together to form a substituted or unsubstituted, saturated, partially saturated or unsaturated $C_5$-$C_{30}$ ring structure optionally containing one or more heteroatoms;

$R^1$ and $R^2$ together with the carbon atom to which they are bonded are joined together to form a substituted or unsubstituted $C_5$-$C_{30}$ cycloalkyl or cycloalkenyl ring, and $R^4$ and $R^5$ together with the carbon atom to which they are bonded are joined together to form a substituted or unsubstituted $C_5$-$C_{30}$ cycloalkyl or cycloalkenyl ring.

19. The tire of claim 18, wherein the second rubber component is a natural rubber.

20. The tire of claim 18, wherein the second rubber composition further comprises one or more of a second antidegradant.

21. The tire of claim 18, wherein the second rubber composition further comprises at least one compound selected from the group consisting of a phenol, hindered phenol, alkylated diphenylamine, 1,2-dihydro-2,2,4-trimethylquinoline, alkylated hydroquinone, N,N'-bis(alkyl)-para-phenylenediamine, N,N'-bis(aryl)-para-phenylenediamine, N-(alkyl)-N'-(aryl)-para-phenylenediamine, quinonediimine, thioester, phosphite, imidazole, naphthylamine, alkylated naphthylamine, triazine and combinations thereof.

22. A tire having a carcass, the carcass comprising a rubber composition comprising (a) at least one rubber component; and (b) an effective amount of at least one substituted or unsubstituted diaryl amine-containing compound represented by the general formula:

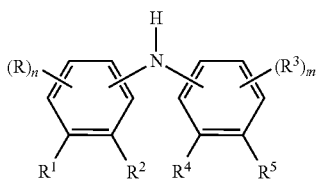

wherein n is from 0 to 3; m is from 0 to 3; each R and $R^3$ substituent is independently hydrogen, a straight or branched $C_5$-$C_{32}$ alkyl group or alkenyl group, substituted or unsubstituted $C_3$-$C_{12}$ cycloalkyl group, substituted or unsubstituted $C_5$-$C_{12}$ aryl group, hydroxyl-containing group, halogen group, substituted or unsubstituted $C_1$-$C_{20}$alkoxy group, ester-containing group, ether-containing group, polyether-containing group, amide-containing group, or amine-containing group or two R substituents and/or two $R^3$ substituents together with the carbon atom to which they are bonded are joined together to form a substituted or unsubstituted saturated partially saturated or unsaturated $C_5$-$C_{30}$ ring structure optionally containing one or more heteroatoms;

$R^1$ and $R^2$ together with the carbon atom to which they are bonded are joined together to form a substituted or unsubstituted $C_5$-$C_{30}$ cycloalkyl or cycloalkenyl ring, and $R^4$ and $R^5$ together with the carbon atom to which they are bonded are joined together to form a substituted or unsubstituted $C_5$-$C_{30}$ cycloalkyl or cycloalkenyl ring.

23. The tire of claim 22, wherein the rubber component is selected from the group consisting of a natural rubber, homopolymer of a conjugated diolefin, copolymer of a conjugated diolefin and an ethylenically unsaturated monomer and mixtures thereof.

24. The tire of claim 22, where in the diaryl amine-containing compound, $R^1$ and $R^2$ together with the carbon atom to which they are bonded are joined together to form a substituted or unsubstituted 5-, 6- or 7-membered cylcoalkyl or cycloalkenyl ring.

25. The tire of claim 24, where in the diaryl amine-containing compound, R, and $R^3$ are hydrogen.

26. The tire of claim 22, where in the diaryl amine-containing compound, $R^1$ and $R^2$ together with the carbon atom to which they are bonded are joined together to form a substituted or unsubstituted 5-, 6- or 7-membered cycloalkyl or cycloalkenyl ring and $R^4$ and $R^5$ together with the carbon atom to which they are bonded are joined together to form a substituted or unsubstituted 5 , 6- or 7-membered cycloalkyl or cycloalkenyl ring.

27. The tire of claim 26, wherein the rubber component is a natural rubber.

28. The tire of claim 22, wherein the rubber composition further comprises at least one antidegradant.

29. The tire of claim 22, wherein the rubber composition further comprises at least one compound selected from the group consisting of a phenol, hindered phenol, alkylated diphenylamine, 1,2-dihydro-2,2,4-trimethylquinoline, alkylated hydroquinone, N,N'-bis(alkyl)-para-phenylenediamine, N,N'-bis(aryl)-para-phenylenediamine, N-(alkyl)-N'-(aryl)-para-phenylenediamine, quinonediimine, thioester, phosphite, imidazole, naphthylamine, alkylated naphthylamine, triazine and combinations thereof.

30. A rubber composition comprising a diaryl amine-containing compound represented by the general formula:

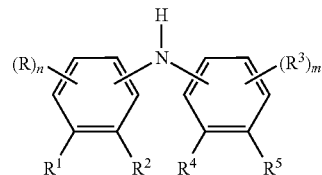

wherein n is from 0 to 3; m is from 0 to 3; each R and $R^3$ substituent is independently hydrogen, a straight branched $C_1$-$C_{32}$ alkyl group or alkenyl group, substituted or unsubstituted $C_3$-$C_{12}$ group, substituted or unsubstituted $C_5$-$C_{12}$ aryl group, hydroxyl-containing group, halogen group, substituted or unsubstituted $C_1$-$C_{20}$ alkoxy group, ester-containing group, ether-containing group, polyether-containing group, amide-containing group, or amine-containing group or two R substituents and/or two $R^3$ substituents together with the carbon atom to which they are bonded are joined together to form a substituted or unsubstituted saturated partially saturated or unsaturated $C_5$-$C_{30}$ ring structure optionally containing one or more heteroatoms;

$R^1$ and $R^2$ together with the carbon atom to which they are bonded are joined together to form a substituted or unsubstituted $C_5$-$C_{30}$ cycloalkyl or cycloalkenyl ring, and $R^4$ and $R^5$ together with the carbon atom to which they are bonded are joined together to form a substituted or unsubstituted $C_5$-$C_{30}$ cycloalkyl or cycloalkenyl ring, having a rating of about 7.5 according to the Dynamic Ozone Belt Test (ASTM D3395 Method B) and a substantially non-discolored surface after about 394 hours.

* * * * *